US008811301B2

(12) United States Patent
Kim et al.

(10) Patent No.: US 8,811,301 B2
(45) Date of Patent: Aug. 19, 2014

(54) METHOD OF TRANSMITTING ACK/NACK BIT SUPPORTING HARQ IN MOBILE COMMUNICATION SYSTEM SUPPORTING MULTI USER MIMO

(75) Inventors: Il-Gyu Kim, Seoul (KR); Hyeong-Geun Park, Daejeon (KR); Young-Jo Ko, Daejeon (KR); Kapseok Chang, Daejeon (KR); Hyoseok Yi, Daejeon (KR); Young-Hoon Kim, Daejeon (KR); Seung-Chan Bang, Daejeon (KR)

(73) Assignees: Electronics and Telecommunications Research Institute (KR); Samsung Electronics Co., Ltd (KR)

( * ) Notice: Subject to any disclaimer, the term of this patent is extended or adjusted under 35 U.S.C. 154(b) by 1024 days.

(21) Appl. No.: 12/664,487

(22) PCT Filed: Jun. 13, 2008

(86) PCT No.: PCT/KR2008/003360
§ 371 (c)(1),
(2), (4) Date: Apr. 26, 2010

(87) PCT Pub. No.: WO2008/153361
PCT Pub. Date: Dec. 18, 2008

(65) Prior Publication Data
US 2010/0208709 A1 Aug. 19, 2010

(30) Foreign Application Priority Data
Jun. 14, 2007 (KR) .................. 10-2007-0058588

(51) Int. Cl.
*H04W 4/00* (2009.01)
*H04W 72/04* (2009.01)
*H04B 7/204* (2006.01)
*H04B 7/216* (2006.01)
*H04B 7/208* (2006.01)
*H04B 7/06* (2006.01)
*H04B 7/04* (2006.01)

(52) U.S. Cl.
CPC .......... *H04W 72/044* (2013.01); *H04B 7/0623* (2013.01); *H04B 7/0417* (2013.01); *H04B 7/061* (2013.01)
USPC .......... 370/329; 370/341; 370/319; 370/320; 370/344

(58) Field of Classification Search
None
See application file for complete search history.

(56) References Cited

U.S. PATENT DOCUMENTS 7,047,473 B2 5/2006 Hwang et al.
(Continued)

FOREIGN PATENT DOCUMENTS

KR 10-2003-0017401 A 3/2003
KR 10-2007-0011030 A 1/2007
(Continued)

OTHER PUBLICATIONS

Samsung, "Downlink Control Channel Structure for E-DCH", R1-041088, 3GPP TSG RAN WG1 #38bis, Sep. 20-24, 2004.
(Continued)

*Primary Examiner* — Ayaz Sheikh
*Assistant Examiner* — Sori Aga
(74) *Attorney, Agent, or Firm* — The Farrell Law Firm, P.C.

(57) ABSTRACT

Provided is a method of efficiently transmitting an acknowledgement/negative acknowledgement (ACK/NACK) bit supporting hybrid automatic repeat request (HARQ) in a wireless communication system supporting multi-user multi-input and multi-output (MIMO). The method transmits the same downlink code and in-phase/quadrature (I/Q) multiplexed ACK/NACK bit to two mobile stations using the same uplink resource block. Accordingly, the method can efficiently transmit the ACK/NACK bit for multi-user MIMO and efficiently use downlink radio resources.

16 Claims, 5 Drawing Sheets

(56) References Cited

U.S. PATENT DOCUMENTS

| | | |
|---|---|---|
| 7,339,949 B2 | 3/2008 | Suzuki et al. |
| 2003/0083093 A1* | 5/2003 | Yun et al. ............... 455/522 |
| 2006/0056360 A1* | 3/2006 | Parkvall et al. ............ 370/335 |
| 2006/0209970 A1* | 9/2006 | Kanterakis ............... 375/259 |
| 2007/0060146 A1 | 3/2007 | Won et al. |
| 2008/0031191 A1* | 2/2008 | Kashima et al. ........... 370/329 |
| 2008/0225822 A1* | 9/2008 | Zhang et al. ............. 370/343 |
| 2008/0260059 A1* | 10/2008 | Pan ...................... 375/260 |

FOREIGN PATENT DOCUMENTS

| | | |
|---|---|---|
| WO | WO 2006-023192 A2 | 3/2006 |
| WO | WO 2008-153361 A1 | 12/2008 |

OTHER PUBLICATIONS

3rd Generation Partnership Project; Technical Specification Group Radio Access Network; Feasibility Study for Enhanced Uplink for UTRA FDD.
(Release 6), 3GPP TR 25.896 V6.0.0, Mar. 2004.

* cited by examiner

FIG. 7B

METHOD OF TRANSMITTING ACK/NACK BIT SUPPORTING HARQ IN MOBILE COMMUNICATION SYSTEM SUPPORTING MULTI USER MIMO

TECHNICAL FIELD

The present invention relates to a method of transmitting an acknowledgement/negative acknowledgement (ACK/NACK) for multi-user multi-input and multi-output (MIMO) in a wireless communication system.

The present invention is derived from a research project supported by the Information Technology (IT) Research & Development (R&D) program of the Ministry of Information and Communication (MIC) of Korea [2005-S-404-02, Research & Development of Radio Transmission Technology for 3G evolution].

This application claims the benefit of Korean Patent Application No. 10-2007-0058588, filed on Jun. 14, 2007, in the Korean Intellectual Property Office, the disclosure of which is incorporated herein in its entirety by reference.

DISCLOSURE OF INVENTION

Technical Problem

The present invention provides a method of efficiently using radio resources when transmitting a downlink acknowledgement/negative acknowledgement (ACK/NACK) for uplink multi-user multiple-input and multiple-output (MIMO) or transmitting a downlink ACK/NACK for downlink multi-user MIMO.

Technical Solution

The method transmits the same downlink code and in-phase/quadrature (I/Q) multiplexed ACK/NACK bit to two mobile stations using the same uplink resource block. Accordingly, the method can efficiently transmit the ACK/NACK bit for multi-user MIMO and efficiently use downlink radio resources.

Advantageous Effects

The method of the present invention can efficiently transmit an ACK/NACK bit for multi-user MIMO and efficiently use downlink radio resources.

DESCRIPTION OF DRAWINGS

The above and other features and advantages of the present invention will become more apparent by describing in detail exemplary embodiments thereof with reference to the attached drawings in which.

BEST MODE

According to an aspect of the present invention, there is provided a method of transmitting an ACK/NACK supporting hybrid automatic repeat request (HARQ) in a mobile communication system supporting multi-user MIMO by performing in-phase/quadrature (I/Q) multiplexing, the method comprising transmitting the same downlink code and I/Q multiplexed ACK/NACK to two mobile stations using the same uplink resource block.

The uplink and the downlink of the mobile communication system may correspond to an orthogonal division multiplexing-based cellular system, a data part and a pilot, which includes channel estimation information for coherent demodulation of the data part, of the uplink resource block may be time-division multiplexed, and the two mobile stations using the same uplink resource block may use different pilot sequence numbers.

The pilot sequence numbers and a real number portion (I) and an imaginary number portion (Q) of the I/Q multiplexed ACK/NACK may be in a one-to-one correspondence relationship.

According to another aspect of the present invention, there is provided a method of transmitting an ACK/NACK supporting HARQ in a mobile communication system supporting multi-user MIMO by performing I/Q multiplexing, the method comprising: multiplexing an uplink between mobile stations using different uplink resource blocks by time-division multiplexing, frequency division multiplexing, or a combination thereof, and transmitting a code division multiplexed and I/Q multiplexed ACK/NACK to the mobile stations using the uplink resource blocks.

The multiplexed ACK/NACK may be repeatedly transmitted on a frequency axis in order to obtain a frequency diversity gain.

The multiplexed ACK/NACK and a pilot including channel estimation information for coherent demodulation of the ACK/NACK may be transmitted to the mobile stations through a downlink.

When the uplink resource blocks used by the mobile stations do not support multi-user MIMO, only one of a real number portion (I) channel and an imaginary number portion (Q) channel of the ACK/NACK may be transmitted.

When the uplink resource blocks used by the mobile stations do not support multi-user MIMO, the mobile stations may be collected in groups of 2, and an orthogonal shift modulated or orthogonal amplitude modulated ACK/NACK may be transmitted.

The ACK/NACK is I/Q multiplexed by using a transmission power difference between channels of a downlink through which the ACK/NACK may be transmitted.

An uplink resource block identification number used by the mobile stations and a code number of a downlink through which the ACK/NACK is transmitted may be mapped to each other in a one-to-one correspondence manner.

An uplink resource block identification number used by the mobile stations and a pilot sequence number of a pilot included in the uplink resource block may be implicitly mapped to a code number and I/Q of a downlink through which the ACK/NACK is transmitted.

When two mobile stations simultaneously use one uplink resource block, an uplink resource block identification number of the uplink resource block used by the two mobile stations may be mapped to the code number of the downlink, and the pilot sequence number may be mapped to whether to use a IQ of multiplexed ACK/NACK.

When four mobile stations simultaneously use one uplink resource block, the four mobile stations using the same uplink resource block may be divided into two groups, the two groups may be mapped to different code numbers of the downlink, and two mobile stations in each of the two groups may perform I/Q multiplexing.

When four mobile stations simultaneously use one uplink resource block, the four mobile stations using the same uplink resource block may be divided into two groups, each of the two groups may allow channels of the downlink through which the ACK/NACK is transmitted to be mapped to different frequencies, and mobile stations in each of the two groups may perform I/Q multiplexing.

Uplink resource blocks which the mobile stations can use in the mobile communication system may be divided into a plurality of resource block groups.

When uplink resource blocks which the mobile stations can use in the mobile communication system are divided into a resource block group supporting multi-user MIMO and a resource block group not supporting multi-user MIMO, if two mobile stations use one uplink resource block, only one pilot sequence number of the source block group not supporting the multi-user MIMO may be mapped and two pilot sequence numbers of the resource block group supporting the multi-user MIMO may be mapped.

Uplink resource blocks which the mobile stations can use in the mobile communication system may be divided into a plurality of resource block groups and the uplink resource block groups may be mapped to different frequencies, four mobile stations using the same uplink resource block may be divided into two groups and each of the two groups may allow channels of the downlink through which the ACK/NACK is transmitted to be mapped to different frequencies, and two mobile stations in each of the two groups may perform I/Q multiplexing.

According to another aspect of the present invention, there is provided a method of demodulating an ACK/NACK by using an I/Q multiplexing mapping table, the method comprising: when an uplink resource block identification number and a pilot sequence number are assigned to a mobile station by a base station in a mobile communication system supporting multi-user MIMO and HARQ, demodulating an ACK/NACK by using a mapping table including mapping information on the uplink resource block identification number and the pilot sequence number assigned to the mobile station, a code number of a downlink through which the ACK/NACK bit is transmitted according to HARQ, a channel frequency of the downlink, and I/Q multiplexing.

In the mobile communication system where four mobile stations belong to one base station and can simultaneously use one uplink resource block, the ACK/NACK may be demodulated, even when the number of mobile stations using the same uplink resource block is 1, 2, and 4, by using a mapping table including information on the uplink resource block simultaneously used by the four mobile stations.

Mode for Invention

The present invention will now be described more fully with reference to the accompanying drawings, in which exemplary embodiments of the invention are shown.

In the following description, the terms of acknowledgement/negative acknowledgement (ACK/NACK), ACK/NACK bit, ACK/NACK signal, ACK/NACK symbol, ACK/NACK channel are interchangeable.

An exemplary case of transmitting a downlink acknowledgement/negative acknowledgement (ACK/NACK) bit for an uplink multi-user multiple-input and multiple-output (MIMO) in a third generation (3G) long term evolution (LTE) system will be explained.

Hybrid automatic repeat request (HARQ) is essential in order to minimize a packet error rate when transmitting packet data of a cellular system.

In HARQ, an ACK bit is transmitted when there is no error in received packet data and a NACK bit is transmitted when there is an error in received packet data. Once the NACK bit is transmitted, the packet data is re-transmitted, and once the ACK bit is transmitted, next packet data is transmitted.

A 3G LTE system provides multi-user MIMO in an uplink and a downlink such that a plurality of users can use the same radio resource, and a receiver can remove interference and demodulate each item of data by using a well-known MIMO demodulation algorithm.

Figure 1:
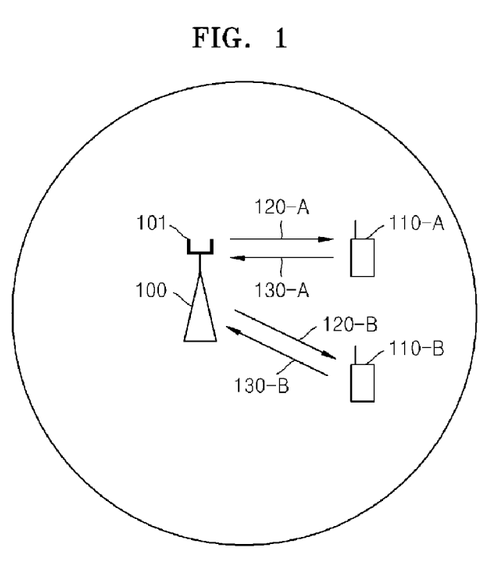
FIG. 1 illustrates a cellular mobile communication system supporting multi-user multiple-input and multiple-output (MIMO) in an uplink according to an embodiment of the present invention.

FIG. 1 illustrates a cellular mobile communication system supporting multi-user MIMO in an uplink according to an embodiment of the present invention.

Referring to FIG. 1, a base station 100 uses a plurality of antennas 101, and a plurality of mobile stations 110-A and 110-B transmit data in uplinks 130-A and 130-B by using the same frequency resource.

The number of the antennas 101 used by the base station 100 is two (2) in FIG. 1. In this case, the mobile stations 110-A and 110-B transmit data in the uplinks 130-A and 130-B, respectively, by using the same resource as shown in FIG. 2.

Figure 2:
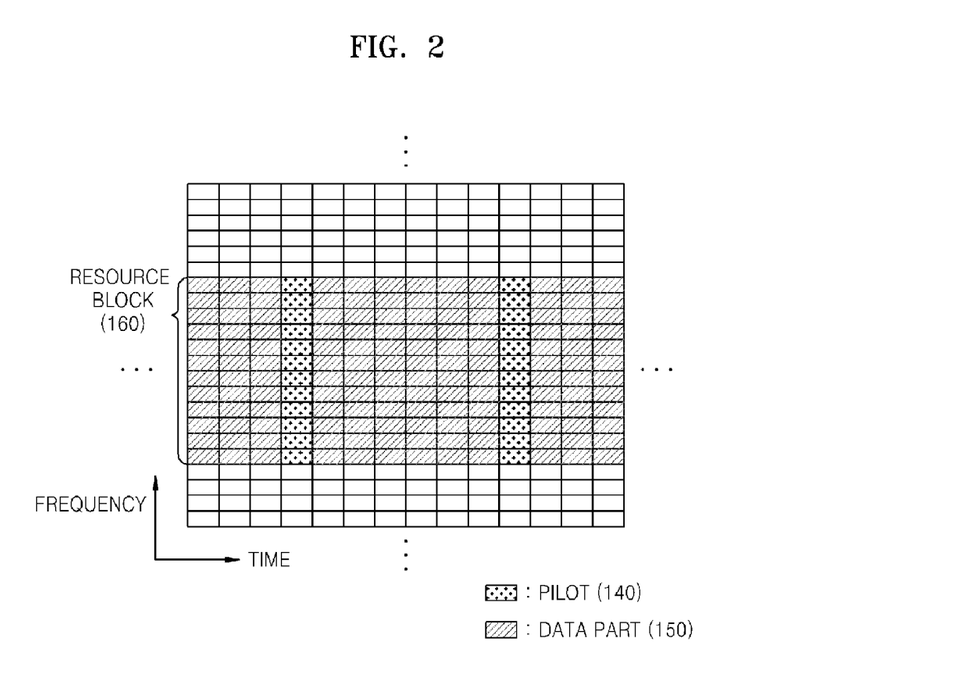
FIG. 2 illustrates an uplink resource block according to an embodiment of the present invention.

FIG. 2 illustrates an uplink resource block according to an embodiment of the present invention.

FIG. 2 illustrates a radio resource for orthogonal frequency division multiple access (OFDMA) or discrete Fourier transform spread (DFT-S) OFDMA transmission in an uplink.

Referring to FIG. 2, a hatched part represents a time/frequency radio resource block 160 assigned to the two mobile stations 110-A and 110-B. That is, as shown in FIG. 2, the two mobile stations 110-A and 110-B transmit signals in the uplinks 130-A and 130-B by using the same resource block 160, and the base station 100 simultaneously demodulates the signals received from the two mobile stations 110-A and 110-B by using a MIMO demodulation algorithm.

Referring to FIG. 2, the resource block 160 includes 12 sub-carriers and 14 orthogonal frequency division multiplexing (OFDM) symbols in an uplink of a 3G LTE system.

The resource block 160 is divided into a pilot 140 and a data part 150. The base station 100 can demodulate uplink multi user MIMO signals received from the two mobile stations 110-A and 110-B using the same resource block 160 by transmitting pilots, which are scrambled with different code sequences, to the pilot 140 used by the two mobile stations 110-A and 110-B.

The base station 100 should transmit ACK/NACK signals in response to the uplink multi-user MIMO signals. The present invention provides a method of transmitting the ACK/NACK signals in response to the multi-user MIMO signals by using the same resource and in-phase/quadrature (I/Q) multiplexing.

Figure 3:
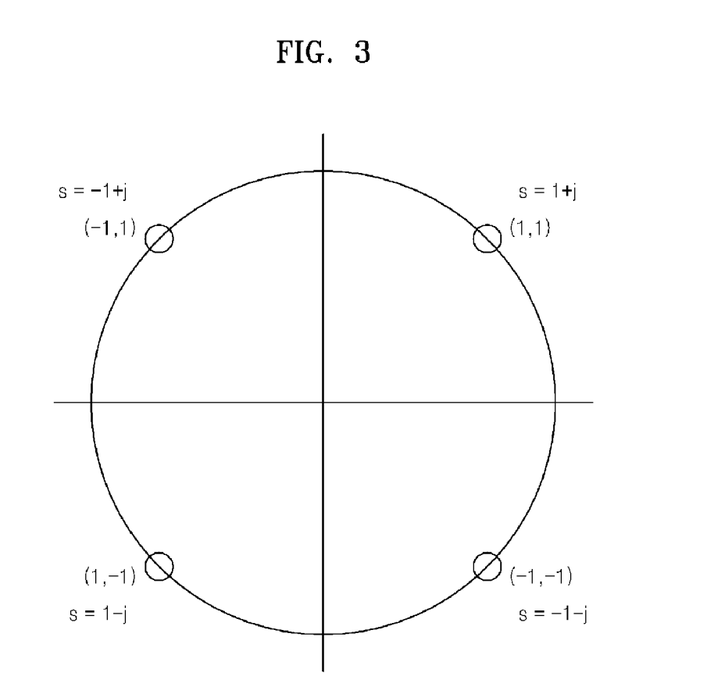
FIG. 3 illustrates quadrature phase shift keying (QPSK) modulation performed on acknowledgement/negative acknowledgement (ACK/NACK) channels for multi-user MIMO according to an embodiment of the present invention.

For example, the method according to the present invention uses a real number portion and an imaginary number portion as an ACK/NACK bit for the two mobile stations 110-A and 110-B by performing quadrature phase shift keying (QPSK) or 4 quadrature amplitude modulation (4 QAM) as shown in FIG. 3.

In this case, radio resources for the downlink ACK/NACK signals can be reduced by a half.

According to the present invention, the ACK/NACK signals may be multiplexed by code division multiplexing (CDM) or CDM/frequency division multiplexing (FDM) between mobile stations using different resource blocks in an uplink. The method according to the present invention transmits a plurality of ACK/NACK signals in response to packet data received from different mobile stations in an uplink by combining I/Q multiplexing and CDM.

FIG. 3 illustrates QPSK modulation performed on ACK/NACK channels for multi-user MIMO according to an embodiment of the present invention.

Figure 4:
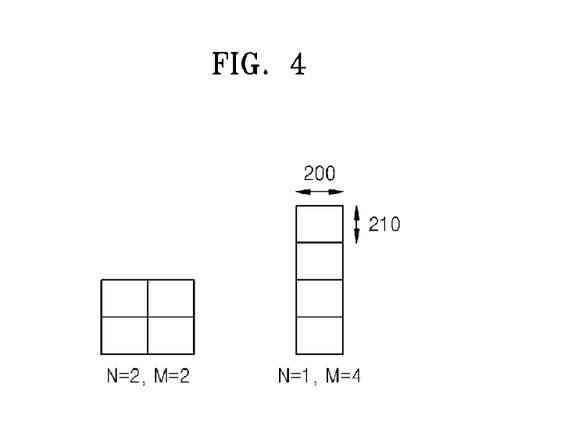
FIG. 4 illustrates a downlink orthogonal frequency division multiplexing (OFDM) resource unit according to an embodiment of the present invention.

FIG. 4 illustrates a downlink OFDM resource unit according to an embodiment of the present invention.

FIG. 4 illustrates OFDM resource mapping for downlink ACK/NACK. When N is the number of OFDM symbols and M is the number of sub-carriers, which are necessary to transmit a QPSK or 4 QAM modulated ACK/NACK symbol for two multi-user MIMO users, a total of 4 (=N×M) time-frequency symbols are used to transmit the QPSK or 4 QAM modulated ACK/NACK symbol.

In FIG. 4, reference numeral 200 denotes an OFDM symbol period, and reference numeral 210 denotes an OFDM sub-carrier bandwidth. When different orthogonal codes, e.g., Hadamard codes with a length of 4, are used, ACK/NACK signals for a total of 8 mobile stations can be transmitted by combining I/Q multiplexing and CDM.

That is, when the four orthogonal codes are respectively $C^{(0)}=\{1,1,-1,-1\}$, $C^{(1)}=\{1,1,-1,-1\}$, $C^{(2)}=\{1,-1,-1,1\}$, and $C^{(3)}=\{1,-1,1,-1\}$, four elements of each of the orthogonal codes are mapped to the four time/frequency symbols of FIG. 4. If the number of uplink packet data users is 8, a finally transmitted signal may be given by $$S_{0,1}C^{(0)} + S_{2,3}C^{(1)} + S_{4,5}C^{(2)} + S_{6,7}C^{(3)} \quad (1)$$

where $S_{j,k}$ is a QPSK or 4 QAM modulated ACK/NACK symbol for $j^{th}$ and $k^{th}$ mobile stations.

Figure 5:
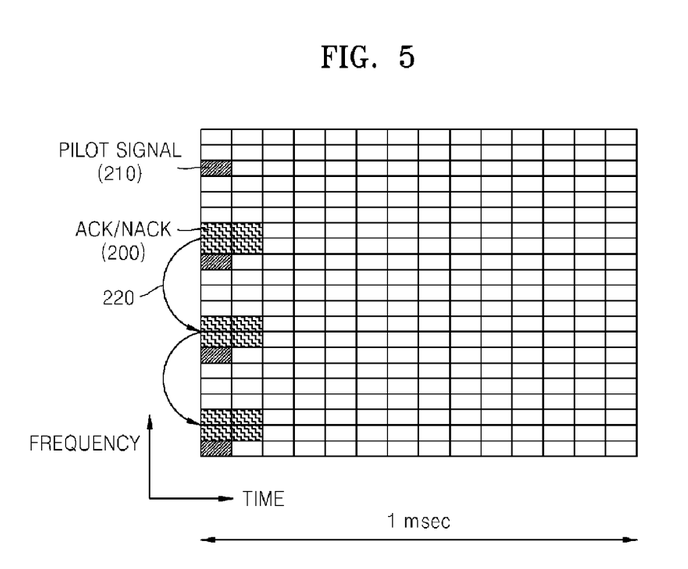
FIG. 5 illustrates a method of repeatedly transmitting ACK/NACK signals to obtain a diversity gain according to an embodiment of the present invention.

Also, the CDM and I/Q multiplexed ACK/NACK signals may be repeatedly transmitted in operation 220 on a frequency axis in order to obtain a frequency diversity gain as shown in FIG. 5.

FIG. 5 illustrates a method of repeatedly transmitting ACK/NACK signals 200 to obtain a diversity gain according to an embodiment of the present invention.

Referring to FIG. 5, the ACK/NACK signals 200 are transmitted three times. A total of 12 frequency/time OFDM symbols belong to a downlink ACK/NACK channel, and the maximum number of users is 8.

A mobile station performs channel estimation by using a pilot signal 210, and uses the channel estimation for coherent demodulation of the ACK/NACK channel.

Figure 6:
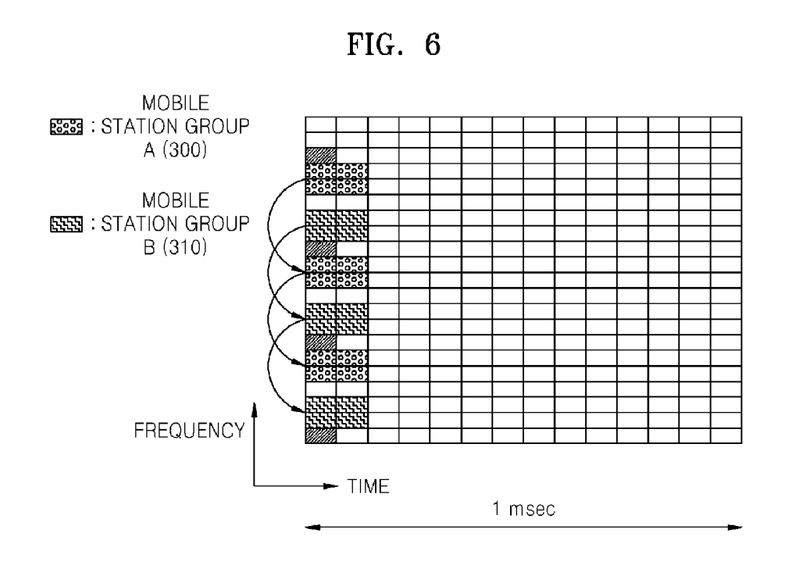
FIG. 6 illustrates hybrid code division multiplexing/frequency division multiplexing (CDM/FDM) performed on a downlink ACK/NACK channel according to an embodiment of the present invention.

FIG. 6 illustrates hybrid CDM/FDM performed on a downlink ACK/NACK channel according to an embodiment of the present invention.

If the number of users exceeds 8, downlink ACK/NACK multiplexing may be performed by hybrid I/Q multiplexing/CDM/FDM as shown in FIG. 6. In FIG. 6, the maximum number of users is 16.

For users not supporting multi-user MIMO, two methods may be used. A first method is to use binary phase shift keying (BPSK). A second method is to use QPSK or 4 QAM modulation in groups of 2 users.

The present invention provides a method that does not request a base station to send a signal to a mobile station by implicitly mapping a code number and an I/Q of the downlink ACK/NACK channel to an uplink resource block number and a pilot sequence number.

It is assumed that a base station has 2 receiving antennas. When the base station has 2 receiving antennas, the number of mobile stations which can transmit data by using one resource block 160 is 2.

In this case, the method according to the present invention maps an orthogonal code number for ACK/NACK transmission to an uplink resource block number, and maps whether to use a real number portion or an imaginary number portion of a QPSK or 4 QAM modulated ACK/NACK bit for ACK/NACK transmission to a pilot sequence number of an uplink pilot 140 assigned by the base station to the mobile stations.

For example, when the number of receiving antennas of the base station is 2 and the number of uplink resource blocks 160 is 4, the maximum number of multi-user MIMO users is 8. In this case, two mobile stations share one resource block, and the two mobile stations have different pilot sequence numbers of the uplink pilot 140.

For example, a zeroth pilot sequence is assigned to a first mobile station and a first pilot sequence is assigned to a second mobile station. In this case, according to the present invention, the mobile station assigned zeroth uplink resource block and the zeroth pilot sequence uses a zeroth code number for downlink ACK/NACK and a real number portion of an ACK/NACK bit subjected to QPSK or 4 QAM.

Table 1 shows an ACK/NACK channel mapping method for an orthogonal code number and an I/Q of receiving antennas of a base station for ACK/NACK transmission. The mapping method is specified in a standard, and mobile stations store the mapping method in advance and demodulate the ACK/NACK channel based on the mapping method.

TABLE 1

| Uplink resource block number | Uplink pilot sequence number | Downlink ACK/NACK orthogonal code number | downlink ACK/NACK I/Q |
|---|---|---|---|
| 0 | 0 | 0 | I |
| 0 | 1 | 0 | Q |
| 1 | 0 | 1 | I |
| 1 | 1 | 1 | Q |
| 2 | 0 | 2 | I |
| 2 | 1 | 2 | Q |
| 3 | 0 | 3 | I |
| 3 | 1 | 3 | Q |

When the number of receiving antennas of the base station is 4, four mobile stations can simultaneously use one uplink resource block 160.

In this case, the four mobile stations using the same resource block 160 are divided into two groups, the two groups use different orthogonal codes for a downlink ACK/NACK channel, and two mobile stations in each of the two groups perform I/Q multiplexing using QPSK or 4 QAM.

In this case, the number of downlink orthogonal codes for ACK/NACK transmission is twice as great compared to when the number of receiving antennas of the base station is 2 as shown in Table 2.

TABLE 2

| Uplink resource block number | Uplink pilot sequence number | Downlink ACK/NACK orthogonal code number | Downlink ACK/NACK I/Q |
|---|---|---|---|
| 0 | 0 | 0 | I |
| 0 | 1 | 0 | Q |
| 0 | 2 | 1 | I |
| 0 | 3 | 1 | Q |
| 1 | 0 | 2 | I |
| 1 | 1 | 2 | Q |
| 1 | 2 | 3 | I |
| 1 | 3 | 3 | Q |
| 2 | 0 | 4 | I |
| 2 | 1 | 4 | Q |
| 2 | 2 | 5 | I |
| 2 | 3 | 5 | Q |
| 3 | 0 | 6 | I |
| 3 | 1 | 6 | Q |
| 3 | 2 | 7 | I |
| 3 | 3 | 7 | Q |

According to another ACK/NACK channel mapping method when the number of receiving antennas of the base station is 4, 4 mobile stations using the same resource block are divided into two groups, the two groups use different frequencies for a downlink ACK/NACK channel, and two mobile stations in each of the two groups perform I/Q multiplexing using QPSK or 4 QAM.

That is, as shown in FIG. 6, mobile stations are divided into a mobile station group A 300 and a mobile station group B 310 and the mobile station groups A 300 and B 310 use different frequencies. Table 3 shows this ACK/NACK channel mapping method.

TABLE 3

| Uplink resource block number | Uplink pilot sequence number | Downlink ACK/NACK orthogonal code number | Downlink ACK/NACK I/Q | Usable frequency |
|---|---|---|---|---|
| 0 | 0 | 0 | I | A |
| 0 | 1 | 0 | Q | A |
| 0 | 2 | 0 | I | B |
| 0 | 3 | 0 | Q | B |
| 1 | 0 | 1 | I | A |
| 1 | 1 | 1 | Q | A |
| 1 | 2 | 1 | I | B |
| 1 | 3 | 1 | Q | B |
| 2 | 0 | 2 | I | A |
| 2 | 1 | 2 | Q | A |
| 2 | 2 | 2 | I | B |
| 2 | 3 | 2 | Q | B |
| 3 | 0 | 3 | I | A |
| 3 | 1 | 3 | Q | A |
| 3 | 2 | 3 | I | B |
| 3 | 3 | 3 | Q | B |

According to another ACK/NACK channel mapping method when the number of receiving antennas of the base station is 4, an uplink resource block is divided into a plurality of resource block groups and different frequencies are assigned to the resource block groups for an ACK/NACK channel as shown in Table 4.

Also, four mobile stations using the same resource block are divided into two groups, the two groups use different orthogonal codes for a downlink ACK/NACK channel, and two mobile stations in each of the two groups perform I/Q multiplexing using QPSK or 4 QAM.

TABLE 4

| Uplink resource block number | Uplink pilot sequence number | Downlink ACK/NACK orthogonal code number | Downlink ACK/NACK I/Q | Usable frequency |
|---|---|---|---|---|
| 0 | 0 | 0 | I | A |
| 0 | 1 | 0 | Q | A |
| 0 | 2 | 1 | I | A |
| 0 | 3 | 1 | Q | A |
| 1 | 0 | 2 | I | A |
| 1 | 1 | 2 | Q | A |
| 1 | 2 | 3 | I | A |
| 1 | 3 | 3 | Q | A |
| 2 | 0 | 0 | I | B |
| 2 | 1 | 0 | Q | B |
| 2 | 2 | 1 | I | B |
| 2 | 3 | 1 | Q | B |
| 3 | 0 | 2 | I | B |
| 3 | 1 | 2 | Q | B |
| 3 | 2 | 3 | I | B |
| 3 | 3 | 3 | Q | B |

Figure 7A:
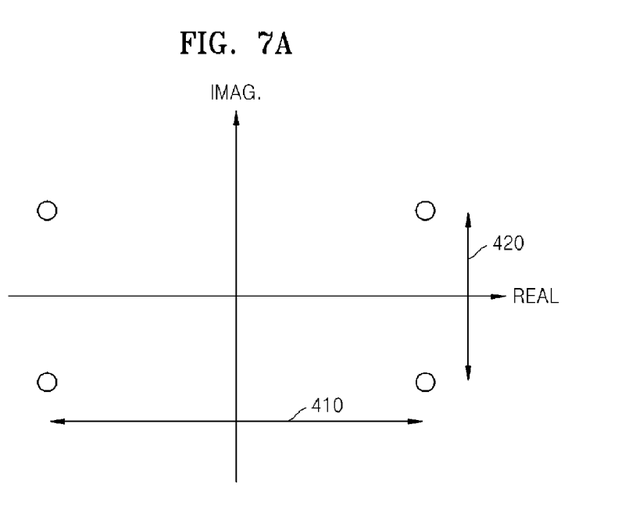
FIG. 7 is a diagram illustrating in-phase/quadrature (I/Q) constellation transmitting an I channel and a Q channel of an ACK/NACK with different powers.
Figure 7B:
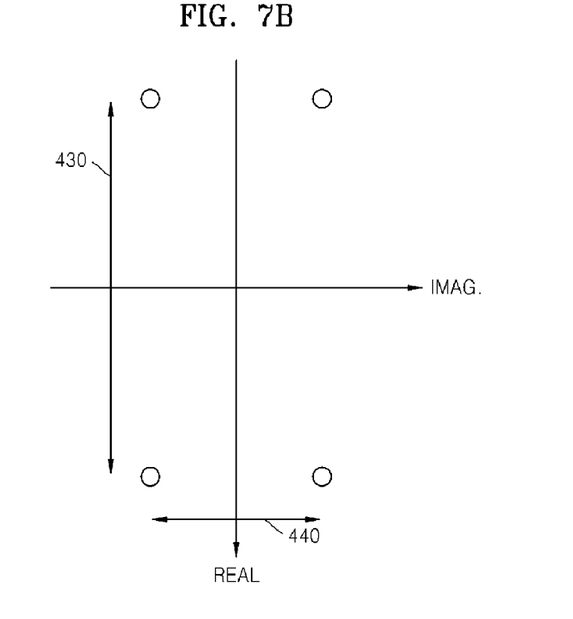

Each downlink ACK/NACK channel according to the present invention is based on independent power control. Accordingly, transmission powers may be different according to channels. In this case, an I/Q constellation of the ACK/NACK channel is a 4 QAM constellation as shown in FIG. 7.

Although the base station has a plurality of receiving antennas, there may be a resource block not using multi-user MIMO according to a data service type. In this case, the method according to the present invention uses only one of an I channel and a Q channel of the downlink ACK/NACK channel for the uplink resource block not using the multi-user MIMO among the uplink resource blocks 160.

Even if a mobile station has a mapping table used for the case where the number of antennas is 4, the mobile station can demodulate the ACK/NACK channel when the number of antennas of a base station is 1, 2, and 4.

For example, even though a mobile station has a mapping table used for the case where the number of antennas is 4 as shown in Table 3, if the number of receiving antennas of a base station is 2 and the base station does not assign a usable frequency B (or second and third uplink pilot sequence numbers) to the mobile station, Table 5, which is used when the number of receiving antennas is 2, is naturally the same as Table 1.

TABLE 5

| Uplink resource block number | Uplink pilot sequence number | Downlink ACK/NACK orthogonal code number | Downlink ACK/NACK I/Q | Usable frequency |
|---|---|---|---|---|
| 0 | 0 | 0 | I | A |
| 0 | 1 | 0 | Q | A |
| (0) | (2) | (0) | (I) | (B) |
| (0) | (3) | (0) | (Q) | (B) |
| 1 | 0 | 1 | I | A |
| 1 | 1 | 1 | Q | A |
| (1) | (2) | (1) | (I) | (B) |
| (1) | (3) | (1) | (Q) | (B) |
| 2 | 0 | 2 | I | A |
| 2 | 1 | 2 | Q | A |
| (2) | (2) | (2) | (I) | (B) |
| (2) | (3) | (2) | (Q) | (B) |

TABLE 5-continued

| Uplink resource block number | Uplink pilot sequence number | Downlink ACK/NACK orthogonal code number | Downlink ACK/NACK I/Q | Usable frequency |
|---|---|---|---|---|
| 3 | 0 | 3 | I | A |
| 3 | 1 | 3 | Q | A |
| (3) | (2) | (3) | (I) | (B) |
| (3) | (3) | (3) | (Q) | (B) |

When the number of receiving antennas of a base station is only 1, the base station needs to only assign a zeroth uplink pilot sequence number to a mobile station as shown in Table 6.

TABLE 6

| Uplink resource block number | Uplink pilot sequence number | Downlink ACK/NACK orthogonal code number | Downlink ACK/NACK I/Q | Usable frequency |
|---|---|---|---|---|
| 0 | 0 | 0 | I | A |
| (0) | (1) | (0) | (Q) | (A) |
| (0) | (2) | (0) | (I) | (B) |
| (0) | (3) | (0) | (Q) | (B) |
| 1 | 0 | 1 | I | A |
| (1) | (1) | (1) | (Q) | (A) |
| (1) | (2) | (1) | (I) | (B) |
| (1) | (3) | (1) | (Q) | (B) |
| 2 | 0 | 2 | I | A |
| (2) | (1) | (2) | (Q) | (A) |
| (2) | (2) | (2) | (I) | (B) |
| (2) | (3) | (2) | (Q) | (B) |
| 3 | 0 | 3 | I | A |
| (3) | (1) | (3) | (Q) | (A) |
| (3) | (2) | (3) | (I) | (B) |
| (3) | (3) | (3) | (Q) | (B) |

Even though a base station has a plurality of receiving antennas and uplink resource blocks are divided into a resource block supporting multi-user MIMO and a resource block not supporting multi-user MIMO, if the base station assigns an uplink resource block number and a pilot sequence number to a corresponding mobile station on the basis of the mapping method of Table 3, which is used when the number of antennas is 4, the mobile station can automatically demodulate an ACK/NACK channel.

For example, when the number of receiving antennas of a base station is 2, zeroth and first uplink resource blocks are resource blocks not supporting multi-user MIMO and second and third uplink resource blocks are resource blocks supporting multi-user MIMO, the base station assigns only one (zeroth) uplink pilot sequence to a mobile station using the zeroth and first uplink resource blocks, and assigns one or two (zeroth and first) uplink pilot sequences to a mobile station using the second and third uplink resource blocks as shown in Table 7.

TABLE 7

| Uplink resource block number | Uplink pilot sequence number | Downlink ACK/NACK orthogonal code number | Downlink ACK/NACK I/Q | Usable frequency |
|---|---|---|---|---|
| 0 | 0 | 0 | I | A |
| (0) | (1) | (0) | (Q) | (A) |

TABLE 7-continued

| Uplink resource block number | Uplink pilot sequence number | Downlink ACK/NACK orthogonal code number | Downlink ACK/NACK I/Q | Usable frequency |
|---|---|---|---|---|
| (0) | (2) | (0) | (I) | (B) |
| (0) | (3) | (0) | (Q) | (B) |
| 1 | 0 | 1 | I | A |
| (1) | (1) | (1) | (Q) | (A) |
| (1) | (2) | (1) | (I) | (B) |
| (1) | (3) | (1) | (Q) | (B) |
| 2 | 0 | 2 | I | A |
| 2 | 1 | 2 | Q | A |
| (2) | (2) | (2) | (I) | (B) |
| (2) | (3) | (2) | (Q) | (B) |
| 3 | 0 | 3 | I | A |
| 3 | 1 | 3 | Q | A |
| (3) | (2) | (3) | (I) | (B) |
| (3) | (3) | (3) | (Q) | (B) |

Alternatively, when there are a plurality of uplink resource blocks, the uplink resource blocks are divided into a plurality of resource block groups and different frequencies are assigned to the uplink resource block groups.

Referring to Table 8, a total of 8 uplink resource blocks are divided into two resource block groups, that is, a first resource block group including zeroth, first, second, and third resource blocks and a second resource block group including fourth, fifth, sixth, and seventh resource blocks, and different frequencies are assigned to the two resource block groups.

Four mobile stations in each of the two uplink resource block groups are divided into two groups, the two mobile station groups use different frequencies for a downlink ACK/NACK channel, and two mobile stations in each of the two mobile station groups perform I/Q multiplexing QPSK or 4 QAM.

That is, mobile stations are divided into a mobile station group A 300 and a mobile station group B 310 as shown in FIG. 6 and the two mobile station groups A 300 and B 300 use different frequencies.

TABLE 8

| Uplink resource block group | Uplink resource block number | Uplink pilot sequence number | Downlink ACK/NACK orthogonal code number | Downlink ACK/NACK I/Q | Usable frequency |
|---|---|---|---|---|---|
| Resource block group 0 | 0 | 0 | 0 | I | A |
| | 0 | 1 | 0 | Q | A |
| | 0 | 2 | 0 | I | B |
| | 0 | 3 | 0 | Q | B |
| | 1 | 0 | 1 | I | A |
| | 1 | 1 | 1 | Q | A |
| | 1 | 2 | 1 | I | B |
| | 1 | 3 | 1 | Q | B |
| | 2 | 0 | 2 | I | A |
| | 2 | 1 | 2 | Q | A |
| | 2 | 2 | 2 | I | B |
| | 2 | 3 | 2 | Q | B |
| | 3 | 0 | 3 | I | A |
| | 3 | 1 | 3 | Q | A |
| | 3 | 2 | 3 | I | B |
| | 3 | 3 | 3 | Q | B |
| Resource block group 1 | 4 | 0 | 0 | I | C |
| | 4 | 1 | 0 | Q | C |
| | 4 | 2 | 0 | I | D |
| | 4 | 3 | 0 | Q | D |
| | 5 | 0 | 1 | I | C |
| | 5 | 1 | 1 | Q | C |
| | 5 | 2 | 1 | I | D |

TABLE 8-continued

| Uplink resource block group | Uplink resource block number | Uplink pilot sequence number | Downlink ACK/NACK orthogonal code number | Downlink ACK/NACK I/Q | Usable frequency |
|---|---|---|---|---|---|
| | 5 | 3 | 1 | Q | D |
| | 6 | 0 | 2 | I | C |
| | 6 | 1 | 2 | Q | C |
| | 6 | 2 | 2 | I | D |
| | 6 | 3 | 2 | Q | D |
| | 7 | 0 | 3 | I | C |
| | 7 | 1 | 3 | Q | C |
| | 7 | 2 | 3 | I | D |
| | 7 | 3 | 3 | Q | D |

The present invention may be embodied as computer-readable codes on a computer-readable recording medium. The computer-readable recording medium is any data storage device that can store data which can be thereafter read by a computer system. Examples of the computer-readable recording medium include read-only memories (ROMs), random-access memories (RAMs), CD-ROMs, magnetic tapes, floppy disks, optical data storage devices, and carrier waves (such as data transmission through the Internet). The computer-readable recording medium can also be distributed over network coupled computer systems so that the compute readable code is stored and execute din a distributed fashion.

While the present invention has been particularly shown and described with reference to exemplary embodiments thereof using specific terms, the embodiments and terms have been used to explain the present invention and should not be construed as limiting the scope of the present invention defined by the claims. Accordingly, it will be understood by those of ordinary skill in the art that various changes in form and details may be made therein without departing from the spirit and scope of the present invention as defined by the following claims.

The invention claimed is:

1. A method of transmitting an acknowledgement/negative acknowledgement (ACK/NACK) supporting Hybrid Automatic Repeat reQuest (HARQ) in a mobile communication system supporting multi-user Multiple Input Multiple Output (MIMO), the method comprising:
   allocating a same downlink code to ACK/NACKs for a plurality of mobile stations sharing an uplink resource block, the plurality of mobile stations including a first mobile station and a second mobile station that transmit the ACK/NACKs using the shared uplink resource block; and
   in-phase/Quadrature (I/Q) multiplexing the ACK/NACKs to allocate an I portion to an ACK/NACK for the first mobile station and to allocate a Q portion to an ACK/NACK for the second mobile station.

2. The method of claim 1, wherein the plurality of mobile stations using the same uplink resource block use different pilot sequence numbers.

3. The method of claim 2, wherein different pilot sequence numbers one-to-one correspond to the I portion and the Q portion.

4. The method of claim 1, wherein the I/Q multiplexed ACK/NACKs are repeatedly transmitted on a frequency axis.

5. The method of claim 1, wherein the I/Q multiplexed ACK/NACKs and a pilot including channel estimation information for coherent demodulation of the I/Q multiplexed ACK/NACKs are transmitted to the plurality of mobile stations through a downlink.

6. The method of claim 1, wherein, when uplink resource blocks used by other mobile stations do not support multi-user MIMO, only one of the I portion and the Q portion is transmitted.

7. The method of claim 1, wherein, when uplink resource blocks used by other mobile stations do not support multi-user MIMO, the mobile stations are collected in groups of 2, and an orthogonal shift modulated or orthogonal amplitude modulated ACK/NACK is transmitted.

8. The method of claim 1, further comprising I/Q multiplexing the ACK/NACKs by using a transmission power difference between channels of a downlink.

9. The method of claim 1, wherein an uplink resource block identification number used by the plurality of mobile stations is mapped to a code number of the downlink code for the ACK/NACKs.

10. The method of claim 1, wherein an uplink resource block identification number used by the plurality of mobile stations and a pilot sequence number of a pilot included in the uplink resource block are implicitly mapped to a code number of the downlink code and the I portion and the Q portion of the ACK/NACKs.

11. The method of claim 10, wherein, when two mobile stations simultaneously use one uplink resource block,
   an uplink resource block identification number of the uplink resource block used by the two mobile stations is mapped to the code number of the downlink code, and
   the pilot sequence number is mapped to the I portion and the Q portion.

12. The method of claim 10, wherein, when four mobile stations simultaneously use one uplink resource block,
   the four mobile stations using the same uplink resource block are divided into two groups, the two groups are mapped to different code numbers of the downlink code, and two mobile stations in each of the two groups perform the I/Q multiplexing.

13. The method of claim 10, wherein, when four mobile stations simultaneously use one uplink resource block,
   the four mobile stations using the same uplink resource block are divided into two groups, the two groups use different frequencies as downlink channels for the ACK/NACKs, and two mobile stations in each of the two groups perform the I/Q multiplexing.

14. The method of claim 12, wherein uplink resource blocks which the mobile stations can use in the mobile communication system are divided into a plurality of resource block groups.

15. The method of claim 10, wherein, when uplink resource blocks which the mobile stations can use in the mobile communication system are divided into a resource block group supporting multi-user MIMO and a resource block group not supporting multi-user MIMO, if two mobile stations use one uplink resource block, only one pilot sequence number of the resource block group not supporting the multi-user MIMO is mapped and two pilot sequence numbers of the source block group supporting the multi-user MIMO are mapped.

16. The method of claim 10, wherein uplink resource blocks which the mobile stations can use in the mobile communication system are divided into a plurality of resource block groups and the uplink resource block groups are mapped to different frequencies,
   four mobile stations using the same uplink resource block are divided into two groups and the two groups use different frequencies as downlink channels for the ACK/NACKs, and
   two mobile stations in each of the two groups perform the I/Q multiplexing.

* * * * *